Figure 1:
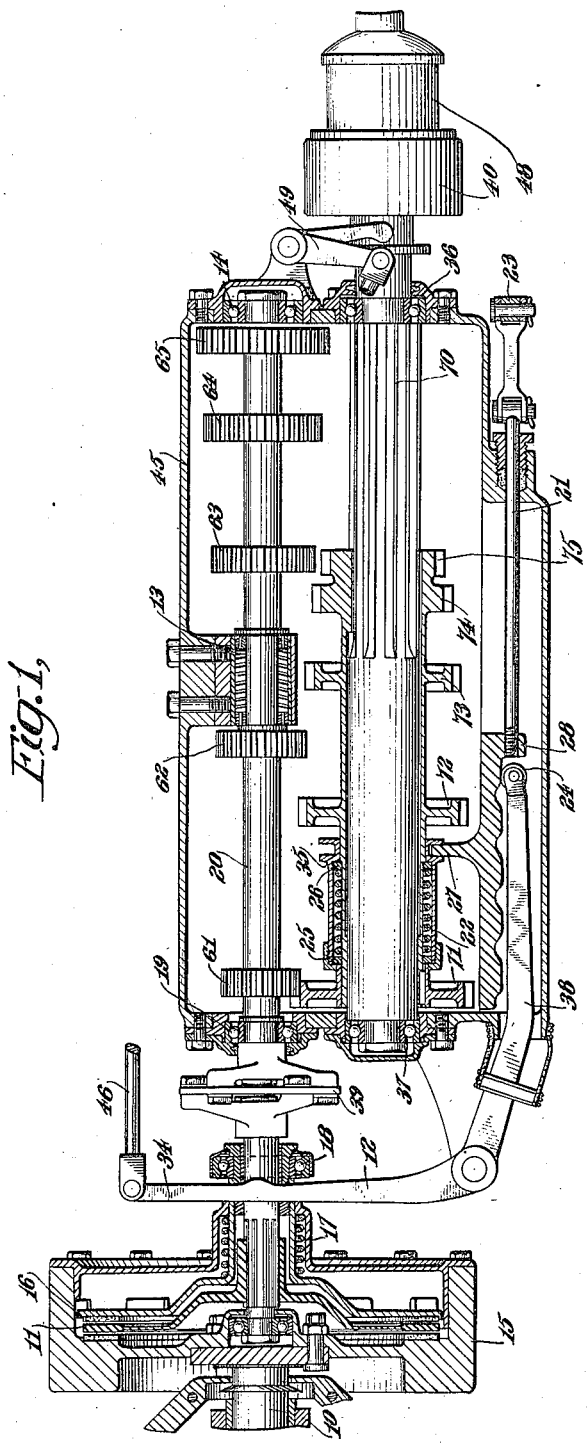

Feb. 13, 1923.

A. E. OSBORN.
TRANSMISSION MECHANISM.
ORIGINAL FILED MAY 6, 1921.

1,445,160.

2 SHEETS—SHEET 1.

Inventor
Alden E. Osborn

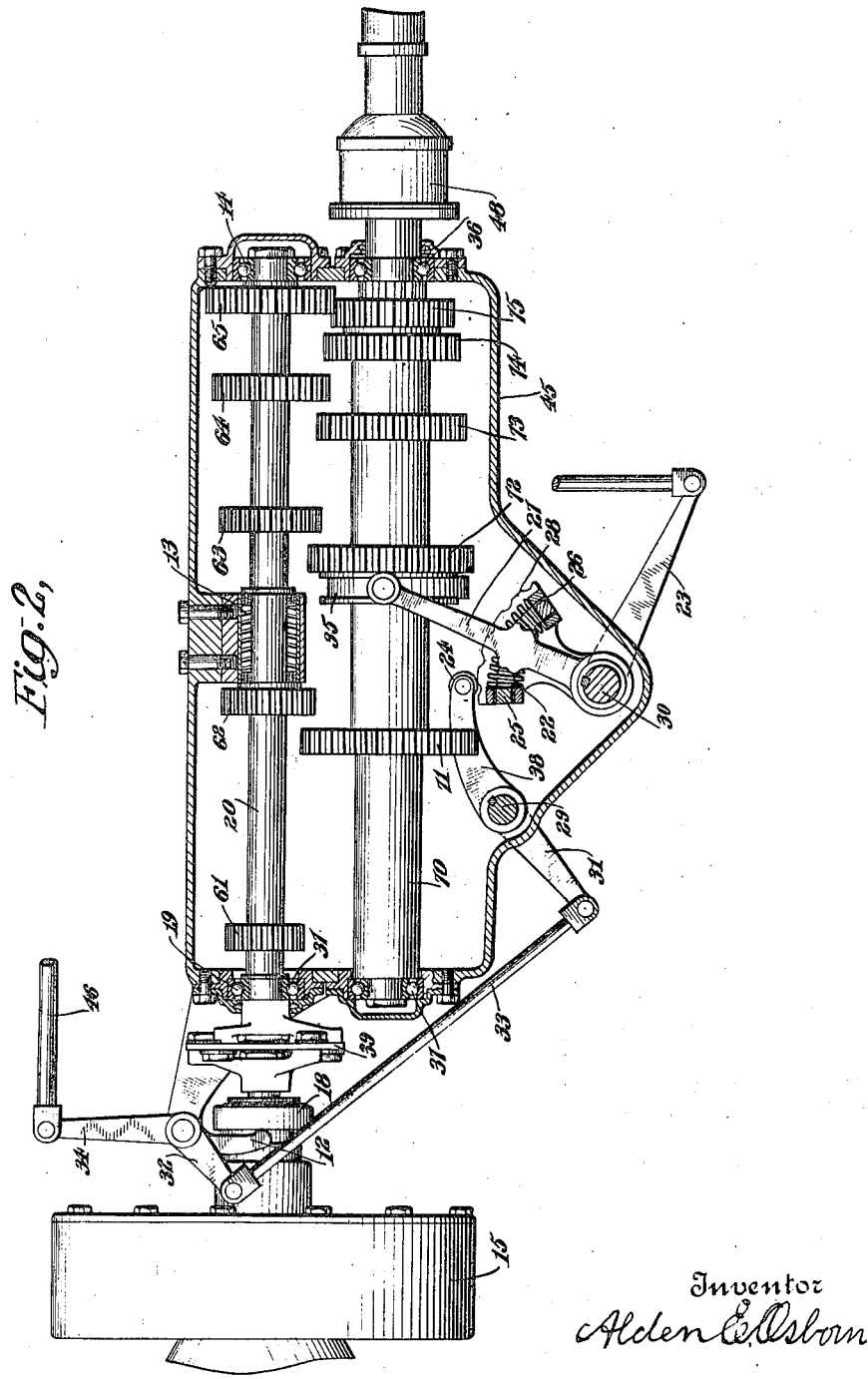

Patented Feb. 13, 1923.

1,445,160

UNITED STATES PATENT OFFICE.

ALDEN E. OSBORN, OF NEW YORK, N. Y.

TRANSMISSION MECHANISM.

Application filed May 6, 1921, Serial No. 467,236. Renewed May 24, 1922. Serial No. 563,368.

*To all whom it may concern:*

Be it known that I, ALDEN E. OSBORN, a citizen of the United States of America, and a resident of New York, county of the Bronx, and State of New York, have invented certain new and useful Improvements in Transmission Mechanism, of which the following is a specification.

This invention relates particularly to a method of operating the clutch and sliding the gears in a transmission mechanism of the sliding gear type and it embodies certain features disclosed in my application for a patent on reverse gears, Serial No. 405,935, filed Aug. 25, 1920, and in my application for a patent on cone-gear transmission mechanism, Serial No. 464,405, filed April 25, 1921, with special modifications and improvements that are required with the arrangement of gears herein illustrated.

The sliding gear which I have shown in the accompanying drawings, it will be noticed, is of a simple type in which all the different speeds are obtained thru the gearing and no direct drive is provided. It will be obvious, however, to anyone skilled in the art that my invention as disclosed herein can be adapted, by slight modifications to use with the more customary form of sliding gear in which a direct drive is provided but I prefer the form herein shown as with this mechanism the various speeds would be used to a greater extent than is usual. It will also be noticed that the sliding elements of the gearing are mounted on the driven shaft instead of the driving or clutch shaft as can obviously be done and as would be done when a direct drive is provided. The arrangement shown is preferred because it enables a very light shaft and light gears to be connected to the clutch member while the sliding gear driven shaft can be made strong and rigid without causing trouble when changing speeds. This mechanism can be arranged to give a larger number of speeds than is usually provided and permits of the use, when applied to a motor vehicle, of a relatively small engine with great efficiency or even of the use of an engine operating at constant speed, the vehicle speed being regulated by the action of the transmission and clutch.

In the accompanying drawing I have, for the purposes of disclosure, illustrated my invention in two forms only but would have it understood that it is susceptible of embodiment in other forms without departure from the true spirit and scope of the invention as defined in the appended claims.

In these drawings:

Figure 1 represents a partial sectional plane view of one form of my invention, and Figure 2 represents a partial sectional plane view of a modification of Fig. 1.

Referring to Fig. 1, 10 indicates the shaft of the motor or engine, or a shaft connected thereto, which shaft carries the fly-wheel or clutch casing 15. This casing 15 contains a friction clutch adapted to connect or disconnect, as required, the main driving shaft or element 20 of the speed change gearing with the primary driving shaft 10 just referred to. The friction clutch is shown as comprising a single driven disc 11 revolving with the driving shaft 20 and a co-operating friction face on the fly-wheel or casing 15 and on the movable disc 16 which disc is normally pressed by the spring 17 toward the fly-wheel, so as to clamp the disc 11 between the two friction surfaces, but can be moved against the action of the spring to disengage the friction surfaces (as shown) by means of the lever 12 which acts against the thrust bearing 18. This friction clutch mechanism can, of course, be modified in any way desired such as by the addition of a number of friction discs on both the driving and driven members or it may even be of entirely different type. The main driving shaft 20 is shown as supported by bearings 13, 14 and 19 in the gear casing 45 and is illustrated as connected to the friction clutch thru a universal or flexible joint 39 so as to allow for any slight lack of alignment between the gear box and clutch shaft. The driving shaft carries the driving gears 61, 62, 63, 64 and 65 (more or less can be used) which gears mesh respectively with the driven gears 71, 72, 73, 74 and 75 slidably mounted on the driven shaft 70 which is carried in bearings 36 and 37 in the casing 45 and is connected to the traction wheels of the vehicle to which this transmission is fitted or to the other apparatus that it is desired to drive. When fitted to a motor vehicle a reverse motion can be obtained by fitting a planetary gear 40 between the driven shaft 70 and the universal joint 48 which gear can be brought into action by the lever 49 when a reverse is desired. The details of this gear are not illustrated as it does not form any part of my present invention and is shown simply to make it clear how a reverse can be fitted should it be desired. In order to slide the gears 71, &c., along the driven shaft 70, a grooved collar 35 is provided which collar acts on these gears thru the medium of the spring 22 and washers 25 and 26 which spring and washers are the equivalent of the spring 22 and washers 25 and 26 of my aforementioned application for a patent on reverse gears, Serial No. 405,935, filed Aug. 25, 1920, and the equivalent of the spring 22 of my aforementioned application for a patent on a cone gear transmission mechanism, Serial No. 464,405, filed April 25, 1921. It enables the gears to be readily engaged even if they should come together with their teeth ends abutting and it permits the parts to be moved so as to engage a different gear ratio even tho the full power of the engine is being applied at the time it is desired to make the change in speed. The collar 35 is moved by the shifting fork 27 which is shown as integral with the cam bar 28 that is slidable in a guideway in the casing 45 parallel with the driven shaft 70 by means of the rod 21 that passes thru the casing 45 and is worked by the lever 23. The cam bar 28 engages the roller 24 mounted on the lever 38 that is connected to the clutch operating lever 12 so that, when one of the cams on the bar is in engagement with the roller 24, as shown, the clutch is held out of engagement. Additional means may be provided to operate the clutch independently of the motion of the cam bar 28 and I have, in this figure, shown an extension 34 on the lever 12 to which a rod 46 is pivoted that can be worked by the operator in any convenient manner.

The operation of this transmission mechanism is as follows:—When the parts are in the position shown in Fig. 1 no power would be transmitted from the shaft 10 to the driven shaft 70 because of the friction clutch being disengaged thru the cam bar 28 being in such a position that the roller 24 is out of the notched portions therein. This neutral position, I prefer, occurs with the gear 61 in partial mesh with the gear 71 (or with any of the other gears should they stand in the same relation) so that the driven shaft would be rotated again, as soon as the lever 23 is moved to bring the gears 61 and 71 into their working position and the clutch into engagement, without the shock due to the clashing of the gear teeth that would take place, under some conditions, if the gears were allowed to stand out of engagement. When the gear 61 is in driving mesh with the gear 71 and the clutch engaged and it is desired to give the driven shaft a greater speed the movement of the lever 23 would first disengage the clutch and then slide the gear 71 out of mesh with the gear 61 and thereafter slide the gear 72 into engagement with its coacting gear 62 whereupon the further movement of the lever would engage the clutch because of the roller 24 going into another notch in the cam bar 28. The same operation would occur when going into another speed or when reducing the speed of the driven shaft 70 by moving the lever 23 the other way. If the gear teeth should abut the spring 22 would compress and allow the cam bar 28 to be moved so that the roller 24 would go into the notch for the particular gear which is to be engaged and the shaft 20 would be slightly rotated, allowing the gears to be engaged by the spring's action, while, if the parts are under so much driving pressure that they cannot be moved thru the normal action of the shifting fork 27, the spring 22 would allow this fork, with the cam bar 28, to move and thus release, thru the roller 24 being pressed out of its bar notch, the friction clutch which, as the shaft 20 would then be freed of all driving pressure, would in turn relieve all the other parts and let them move freely to the position desired. It will thus be seen that with this transmission mechanism the variations in speed can all be obtained by the operation of a single controlling member which may be either directly manually operated or may be, as might be preferable with a very large mechanism, operated by some kind of power which in turn could be manually controlled with slight effort.

In Fig. 2 is shown a form of my transmission mechanism operating on the same principles as the mechanism just described but containing certain modifications in construction. For instance the cam bar 28 is in the form of a segment of a circle and is mounted upon the shaft 30 to which the lever 23 is directly applied. The semicircular cam bar 28 acts on the clutch exactly the same as the straight cam bar of Fig. 1 altho it is connected to the clutch releasing lever 12 in a slightly different manner as the lever 38 is fastened to the shaft 29 on which is mounted the lever 31 which is connected to the lever 32 that turns with the lever 12 by a suitable rod 33. Another modification is in the arrangement of the spring 22 which, instead of being about the sliding gear sleeve between the collar 35 and the sleeve, is carried by the cam bar segment 28 and acts to normally hold the gear shifting lever 27 rigid with the cam segment (by the fingers 25 and 26 on the gear shifting lever and the projections on the segment bearing on both ends of the spring 22) altho it allows, as set forth in the description of Fig. 1, the cam bar segment 28 to move, should the gears be prevented from sliding freely. The lever 27 is, of course, pivoted about the shaft 30 so as to allow of this independent movement.

The object in illustrating the mounting of the spring 22 in this way is to bring out clearly that I am not limited in my application of this spring to its mounting in any particular place but that it can be applied at any point between the cam mechanism for actuating the clutch, which is connected to the manually operated control devices, and lever or arm for sliding the gears. The gears are shown in this Fig. 2 with the high speed gears 65 and 75 in mesh tho not in their running position but in what I term "high speed neutral position" (the clutch being released) so that, upon bringing them to the running position, the high speed drive would be obtained without remeshing the gears.

Having thus described my invention, I claim as new and desire to secure by Letters Patent:—

1. In a transmission mechanism the combination of a primary driving member, a driving element, and a driven element, a friction clutch adapted to connect or disconnect said primary driving member and said driving element, gears of different sizes mounted on the driving element, coacting gears of different sizes mounted on the driven element and longitudinally slidable thereon so that any one thereof can be brought into working mesh with its coacting gear on the driving element, a movable member for operating said clutch to connect or disconnect said primary driving member and said driving element, and connecting means containing an elastic element between said slidable gears and said member whereby said slidable gears are normally moved by the motion of said member without said elastic element coming into action when said member is moved to bring any one of the said slidable gears into mesh with its coacting gear on the driving element, and whereby, should said slidable gears be detained from free movement, said member can move, thru the action of said elastic element, and operate on said clutch to connect or disconnect said primary driving member and said driving element.

2. In a transmission mechanism the combination of a primary driving member, a driving element, and a driven element, controllable means to connect or disconnect said primary driving member and said driving element, gears of different sizes fastened to one of said elements, coacting gears of different sizes mounted on the other of said elements and longitudinally slidable thereon so that any one thereof can be brought into working mesh with its coacting gear on the other element, a movable member for operating said means to connect or disconnect said primary driving member and said driving element, and connecting means containing an elastic element between said slidable gears and said member whereby said slidable gears are normally moved by the motion of said member without said elastic element coming into action when said member is moved to bring any one of said slidable gears into mesh with its coacting gear, and whereby, should said slidable gears be detained from free movement by the ends of the gear teeth abutting, said member can move, thru the action of said elastic element, and operate on said means to connect or disconnect said primary driving member and said driving element to cause said driving element to rotate with said driving member.

3. In a transmission mechanism the combination of a primary driving member, a driving element, and a driven element, controllable means to connect or disconnect said primary driving member and said driving element, gears of different sizes fastened to one of said elements, coacting gears of different sizes mounted on the other of said elements and longitudinally slidable thereon so that any one thereof can be brought into working mesh with its coacting gear on the other element, a movable member for operating said means to connect or disconnect said primary driving member and said driving element, and connecting means containing an elastic element between said slidable gears and said member whereby said slidable gears are normally moved by the motion of said member without said elastic element coming into action when said member is moved to bring any one of said slidable gears out of mesh with its coacting gear, and whereby, should said slidable gears be detained from free movement by the driving pressure thereon, said member can move, thru the action of said elastic element, and operate said means to connect or disconnect said primary driving member and said driving element to cause said driving element to be released from said driving member.

4. In a transmission mechanism the combination of a primary driving member, a driving shaft, and a driven shaft, a clutch adapted to connect or disconnect said primary driving member and said driving shaft, gears of different sizes fastened to one of said shafts, coacting gears of different sizes mounted on the other of said shafts and longitudinally slidable thereon so that any one thereof can be brought into working mesh with its coacting gear on the other shaft, a movable member for operating said clutch, and connecting means containing an elastic element actuated by said member and acting to bring any one of said slidable gears into mesh with its coacting gear without said elastic element coming into action under normal conditions and acting to bring the gears desired into driving mesh when the teeth thereon abut, by the action of said elastic element allowing the movement of said member for operating the clutch to engage the same and cause said driving shaft to rotate with said driving member.

5. In a transmission mechanism the combination of a primary driving member, a driving shaft, and a driven shaft, a clutch adapted to connect or disconnect said primary driving member and said driving shaft, gears of different sizes fastened to one of said shafts, coacting gears of different sizes mounted on the other of said shafts and longitudinally slidable thereon so that any one thereof can be brought into working mesh with its coacting gear on the other shaft, a movable member for operating said clutch to cause the engagement thereof at spaced intervals in its movement and for bringing any one of said slidable gears into mesh with its coacting gear at the said spaced intervals in its movement when the clutch is engaged, and an elastic element in the connection to said member for controlling the meshing of the said gears whereby said member can move to engage the said clutch should the ends of the teeth on said gears abut.

6. In a transmission mechanism the combination of a primary driving member, a driving shaft, and a driven shaft, a clutch adapted to connect or disconnect said primary driving member and said driving shaft, gears of different sizes fastened to one of said shafts, coacting gears of different sizes mounted on the other of said shafts and longitudinally slidable thereon so that any one thereof can be brought into working mesh with its coacting gear on the other shaft, a movable member for operating said clutch and for bringing any one of said slidable gears into mesh with its coacting gear and having, in the connection between it and the clutch, spaced cams to cause the engagement of the clutch at spaced intervals in its movement, and having, in the connection between it and the slidable gears, an elastic element whereby it can move to engage the said clutch should the ends of the gear teeth abut.

7. In a transmission mechanism the combination of a primary driving member, a driving shaft, and a driven shaft, a clutch adapted to connect or disconnect said primary driving member and said driving shaft, gears of different sizes fastened to one of said shafts, coacting gears of different sizes mounted on the other of said shafts and longitudinally slidable thereon so that any one thereof can be brought into working mesh with its coacting gear on the other shaft, a movable member for operating said clutch and for bringing any one of said slidable gears into mesh with its coacting gear and having, in the connection between it and the clutch, spaced cams to cause the engagement of the clutch at spaced intervals in its movement, and having, in the connection between it and the slidable gears, an elastic element whereby it can move to disengage the said clutch should the driving pressure prevent the movement of said slidable gears.

8. In a transmission mechanism the combination of a primary driving member, a driving shaft, and a driven shaft, a clutch adapted to connect or disconnect said primary driving member and said driving shaft, gears of different sizes fastened to one of said shafts, coacting gears of different sizes mounted on the other of said shafts and longitudinally slidable thereon so that any one thereof can be brought into working mesh with its coacting gear on the other shaft, and a movable member for operating said clutch and for bringing any one of said slidable gears into mesh with its coacting gear and having, in the connection between it and clutch, spaced cams to cause the engagement of the clutch at the spaced intervals of when the gears are in driving relation and to cause the disengagement of the clutch at the spaced intervals of the disengagement of the gears, and means for causing the disengagement of the clutch independently of the movement of said member.

9. In a transmission mechanism the combination of a primary driving member, a driving shaft, and a driven shaft, a clutch adapted to connect or disconnect said primary driving member and said driving shaft, gears of different sizes fastened to one of said shafts, coacting gears of different sizes mounted on the other of said shafts and longitudinally slidable thereon so that any one thereof can be brought into working mesh with its coacting gear on the other shaft, a movable member for operating said clutch and for bringing any one of said slidable gears into mesh with its coacting gear on the other shaft and having, in the connection between it and the clutch, spaced cams to cause the engagement of the clutch at spaced intervals in its movement, and having, in the connection between it and the slidable gears, an elastic element whereby it can move to engage or to disengage the said clutch should the slidable gears be detained from free movement, and means for causing the disengagement of the said clutch independently of the movement of said member.

10. In a transmission mechanism the combination of a primary driving member, a driving shaft, and a driven shaft, a clutch adapted to connect or disconnect said primary driving member and said driving shaft, gears of different sizes fastened to one of said shafts, coacting gears of different sizes mounted on the other of said shafts and longitudinally slidable thereon so that any one thereof can be brought into working mesh with its coacting gear on the other shaft, and a movable member for operating said clutch and for bringing any one of said slidable gears into mesh with its coacting gear on the other shaft and having, in the connection between it and the clutch, a cam bar having spaced cams and a roller bearing upon said cams and acting to cause the engagement of the said clutch at the spaced intervals of when the gears are in driving relation and to cause the disengagement of the clutch at the spaced intervals of the disengagement of the gears.

11. In a transmission mechanism the combination of a primary driving member, a driving shaft, and a driven shaft, a clutch adapted to connect or disconnect said primary driving member and said driving shaft, gears of different sizes fastened to one of said shafts, coacting gears of different sizes mounted on the other of said shafts and longitudinally slidable thereon so that any one thereof can be brought into working mesh with its coacting gear on the other shaft, and a pivotally mounted movable member for operating said clutch and for bringing any one of said slidable gears into mesh with its coacting gear on the other shaft and having, in the connection between it and the clutch, a cam bar having a curved cam surface with cams thereon spaced to cause the engagement of the said clutch at the spaced intervals of when the gears are in driving relation and to cause the disengagement of the clutch at the spaced intervals of the disengagement of the gears.

In witness whereof, I have hereunto set my hand this 4th day of May, 1921.

ALDEN E. OSBORN.